Dec. 23, 1930.                S. C. CUTLER                1,786,150
                      APPARATUS FOR PURIFYING GASES
                           Filed Oct. 22, 1926
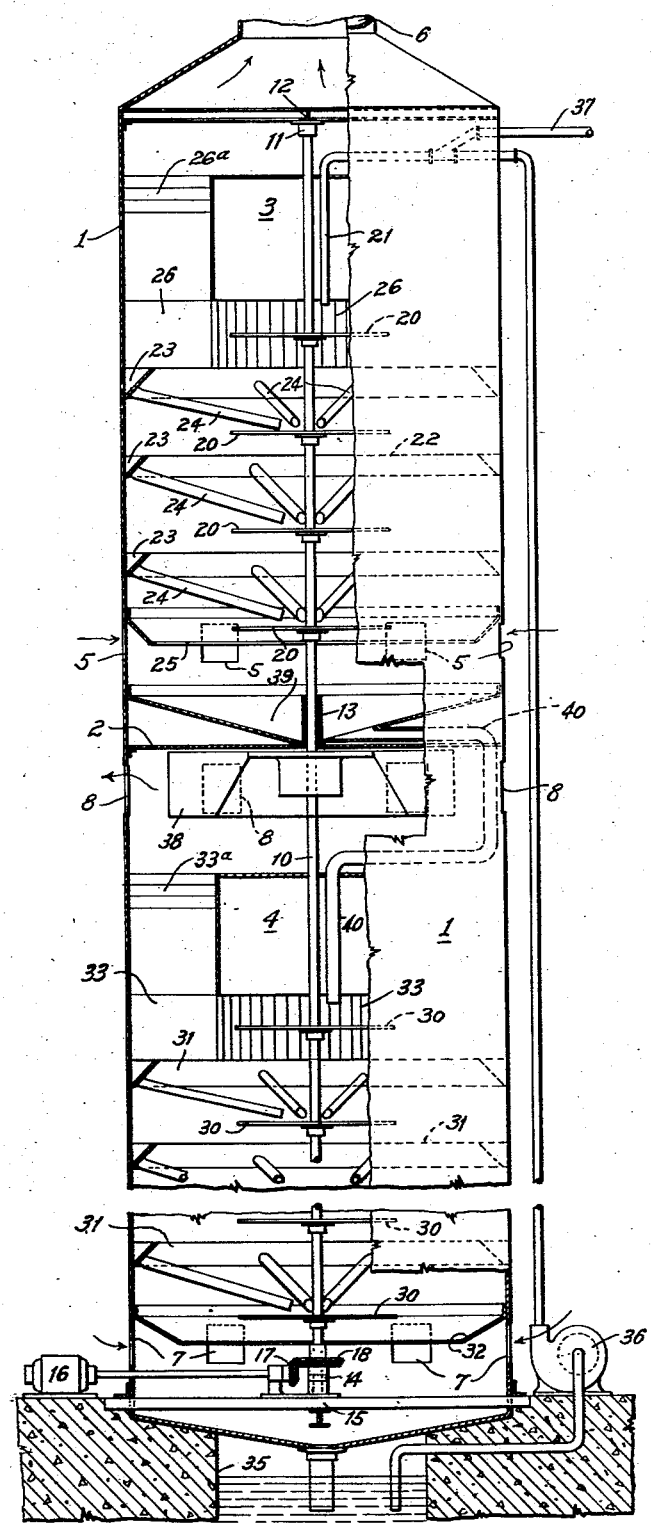
INVENTOR.
Samuel C. Cutler
BY Dunn Dunn & Anderson
ATTORNEYS.

Patented Dec. 23, 1930

1,786,150

UNITED STATES PATENT OFFICE

SAMUEL C. CUTLER, OF MURRAY HILL, NEW JERSEY

APPARATUS FOR PURIFYING GASES

Application filed October 22, 1926. Serial No. 143,390.

This invention relates to gas purification, and more particularly to process and apparatus for purifying gases by contact with liquids, and for regenerating the liquids for re-use. It has heretofore been a common practice in gas purification to bring the gas into intimate contact with alkaline solutions to absorb impurities and objectionable chemicals such as sulphur compounds, and to subsequently pass the liquids so contaminated over porous coke for the purpose of restoring it to its original condition for re-use. Such procedure, however, as heretofore conducted, has been inefficient in that thorough cleansing of the gas was not obtained, and has been expensive by reason of the large apparatus required.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawing, in which:

The drawing is an elevation partly in section of an apparatus embodying this invention. The invention generally includes, therefore, means for removing the impurities from the gas and means for restoring the condition of the liquid which has been used to accomplish that purpose. I prefer to incorporate these elements as a unitary apparatus, and in the drawing this has been done by superposing them one upon another. This superposition also enables them to be operated by a common shaft.
In the drawings numeral 1 designates a casing of general cylindrical form divided intermediate its length by a partition 2 to form an upper chamber 3 and a lower chamber 4. As illustrated, the upper chamber is intended to purify the gas while the lower chamber is intended to reactivate the purifying solutions. The upper chamber has a gas inlet 5 near its lower end, and a gas outlet 6 at its upper end, while the lower chamber has an air inlet 7 at its lower end and an air outlet 8 at its upper end. A shaft 10 is disposed axially within the casing, having a bearing 11 in a spider 12 at the top of the casing, a bearing 13 in the partition 2 and a bearing 14 in a spider 15 at the bottom of the casing. A motor 16, which may be mounted outside the casing, operates the shaft 10 by bevel gears 17 and 18.

I may now refer more particularly to the gas purifying apparatus in the upper chamber. A plurality of disks 20 are mounted upon the shaft 10 in vertically spaced relation, and means are provided for supplying liquid to each of these disks so that as the disks are rotated by the motor 16, a spray will be projected tangentially from the periphery. Liquid is supplied to the upper disk through an inlet pipe 21, and by that disk projected to the walls of the casing. A plurality of conical baffles are attached to the inner walls of the casing just below each disk, as shown at 22, which are so designed as to form, with the casing, a pocket 23 for the reception of the liquid as it flows down the interior wall of the casing. Pipes 24 communicate with the pocket 23 and discharge the liquid on the inner portion of the next lower disk. Below the lowermost disk, however, the baffle 25 may conveniently be inclined downwardly toward the center, there being no lower disk to receive its discharge. This baffle assists in preventing the liquid from splashing out of the inlet orifice. Under many circumstances it may be desirable to associate with the uppermost disk a plurality of radially disposed spaced plates 26, which, receiving the liquid sprayed from the uppermost disk 20, become thoroughly wetted and furnish a large wetted surface over which the incoming gases pass.

A convenient liquid for use in this apparatus is an aqueous solution of caustic soda which, when brought into intimate contact with the gas, has a capacity to absorb the noxious fumes contained within the gas, such, for example, as sulphur dioxide.

In order to again purify the caustic solution for re-use, it is passed through the lower portion of the apparatus, which is generally similar to the upper. In this lower apparatus, which may be termed the actifier, because of its action upon the solution, there is a plurality of disks 30 and baffles 31 and 32 constructed similar to and functioning like the disks 20 and baffles 22 and 25, respectively. Similarly wet plates 33 may be employed similar to the plates 26.

In this portion of the apparatus it is designed that air shall be drawn in at the inlet and forced out at the outlet, so that by coming into contact with the caustic solution it may absorb from it the noxious fumes, restoring the caustic to its original condition.

Liquid thus entering the upper chamber at the top thoroughly cleanses the gas of impurities and thus becomes contaminated; it then enters the lower chamber at the top, here it gives up its impurities to the air, which is drawn through the apparatus, just as in the coke towers at present in use. Finally, after purification, it passes into a sump 35 at the bottom of the apparatus, from whence it is circulated to the top of the apparatus by a pump 36.

An auxiliary source of liquid is shown at 37, which may feed to the apparatus fresh solution at any time found desirable. The gas and the air are moved through the apparatus in any convenient manner; as illustrated, it is intended that the gas be drawn through the apparatus by a fan (not shown), while a fan 38, mounted upon the shaft 10 at the upper end of the lower chamber, is arranged to effect the circulation of the air. In order to conduct the liquid from the upper chamber to the lower, there may be provided at the bottom of the upper chamber a conical deflector 39, communicating with the pipe 40, which conducts the liquid to the upper disk of the lower chamber. If the air on leaving the outlet 8 is sufficiently objectionable to make it necessary, it may be disposed of in any convenient manner. By this construction it will be seen that in a single apparatus the gas is purified and the purified liquid reactified in a thorough and efficient manner, and with a minimum of apparatus.

Since certain changes in carrying out the above process, and in the constructions set forth, which embody the invention, may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A device of the character described, comprising, in combination, a casing, a partition dividing said casing into two chambers, an air inlet and outlet for each of said chambers, a spraying device including a plurality of atomizing disks in each of said chambers, means for conducting fluid from the upper chamber to be atomized by the disks in the lower chamber, a sump in one of said chambers for collecting the sprayed liquid, and means for conducting liquid from said sump to the spraying device in said other chamber.

2. In a device of the character described comprising, in combination, a casing, a partition dividing said casing into two chambers, a shaft extending axially of said casing, atomizing means in each of said chambers attached to said shaft, pockets in the walls of said casing for receiving spray, and means from said pockets for distributing the liquid for reatomization, an air inlet and outlet in each of said chambers.

3. In a device of the character described, comprising, in combination, a casing, a partition dividing said casing into two chambers, a shaft extending axially of said casing, a spraying device in each of said chambers attached to said shaft, means for supplying liquid to said spraying devices, an air inlet and outlet in each of said chambers, and a fan connected with said shaft for causing a circulation in one of said chambers.

4. In a device of the character described comprising, in combination, a casing, a partition dividing said casing into two chambers, a shaft extending axially of said casing, a spraying device in each of said chambers attached to said shaft, means for conducting liquid to be sprayed from one of said chambers to the other, an air inlet and outlet in each of said chambers, a sump in one of said chambers for collecting sprayed liquid, and means for conducting liquid from said sump to the spraying device in said other chamber.

5. In a device of the character described, in combination a plurality of chambers, a spraying device in each chamber, means for conducting fluid from one of said chambers to the other, means in combination with the walls of said chambers for collecting the spray and distributing it for reatomization, a sump in one of said chambers to receive the sprayed liquid and means for conducting the liquid from said sump to the spraying device of said other chamber.

6. Gas purifying apparatus comprising a casing having one section for bringing gas in intimate contact with a caustic solution and another section for regenerating the caustic solution by contact with air, a shaft extending axially of said casing, a plurality of disks on said shaft in each of said sections, and means for directing the flow of solution through said casing whereby it will be substantially atomized in the form of a spray by each of said disks and the spray collected for continuous reuse in the system.

7. In a gas purifying apparatus, means for passing gas through a spray of caustic solution, means for regenerating the caustic solution by spraying the same through air, both said means comprising a casing divided into a lower and upper chamber, means for circulating gas through the upper chamber, means for circulating air through the lower chamber, means for spraying the solution through said circulating gas and subsequently spraying said solution through said current of air, centrifugal means for alternately breaking up the solution into a spray and means for collecting the spray from the walls of the casing to be reused in the apparatus.

In testimony whereof I affix my signature.

SAMUEL C. CUTLER.